United States Patent
Mizuno

(10) Patent No.: US 7,961,114 B2
(45) Date of Patent: Jun. 14, 2011

(54) WEATHER INFORMATION NOTIFICATION APPARATUS AND PROGRAM STORAGE MEDIUM

(75) Inventor: Tomoaki Mizuno, Toyoake (JP)

(73) Assignee: DENSO CORPORATION, Kariya (JP)

(*) Notice: Subject to any disclaimer, the term of this patent is extended or adjusted under 35 U.S.C. 154(b) by 267 days.

(21) Appl. No.: 12/289,414

(22) Filed: Oct. 28, 2008

(65) Prior Publication Data

US 2009/0109059 A1   Apr. 30, 2009

(30) Foreign Application Priority Data

Oct. 30, 2007   (JP) ................... 2007-281312

(51) Int. Cl.
- *G08G 1/095* (2006.01)
- *G08G 1/123* (2006.01)
- *G08G 1/00* (2006.01)
- *G01W 1/00* (2006.01)

(52) U.S. Cl. ........ 340/905; 340/901; 340/601; 340/988; 340/995.1

(58) Field of Classification Search .................. None
See application file for complete search history.

(56) References Cited

U.S. PATENT DOCUMENTS

| | | | |
|---|---|---|---|
| 6,006,076 | A | 12/1999 | Nakamura |
| 7,171,305 | B2 | 1/2007 | Minato et al. |
| 2003/0069689 | A1 | 4/2003 | Ihara et al. |
| 2007/0094262 | A1 | 4/2007 | Suzuki et al. |
| 2007/0185648 | A1 | 8/2007 | Gretton |
| 2007/0225902 | A1 | 9/2007 | Gretton et al. |
| 2009/0144268 | A1* | 6/2009 | Nagase ............ 707/5 |
| 2009/0207044 | A1* | 8/2009 | Tomita et al. ......... 340/932.2 |
| 2010/0138098 | A1* | 6/2010 | Takahara et al. ......... 701/29 |
| 2010/0299062 | A1 | 11/2010 | Gretton |

FOREIGN PATENT DOCUMENTS

| | | |
|---|---|---|
| JP | A-11-002539 | 1/1999 |
| JP | A-11-316126 | 11/1999 |
| JP | A-2002-148061 | 5/2002 |
| JP | A-2007-085938 | 4/2007 |

OTHER PUBLICATIONS

Office Action mailed Sep. 29, 2009 from the Japan Patent Office for corresponding patent application No. 2007-281312 (English translation enclosed).

Office Action dated Apr. 4, 2011, from European Patent Office in corresponding patent application No. 08 018 506.9.

* cited by examiner

*Primary Examiner* — Julie Lieu

(74) *Attorney, Agent, or Firm* — Posz Law Group, PLC

(57) ABSTRACT

In a vehicular navigation system, a control circuit acquires weather information and displays (i) a map containing a present position and (ii) weather information relative to a position outside a display range of the map, among the acquired weather information.

11 Claims, 4 Drawing Sheets

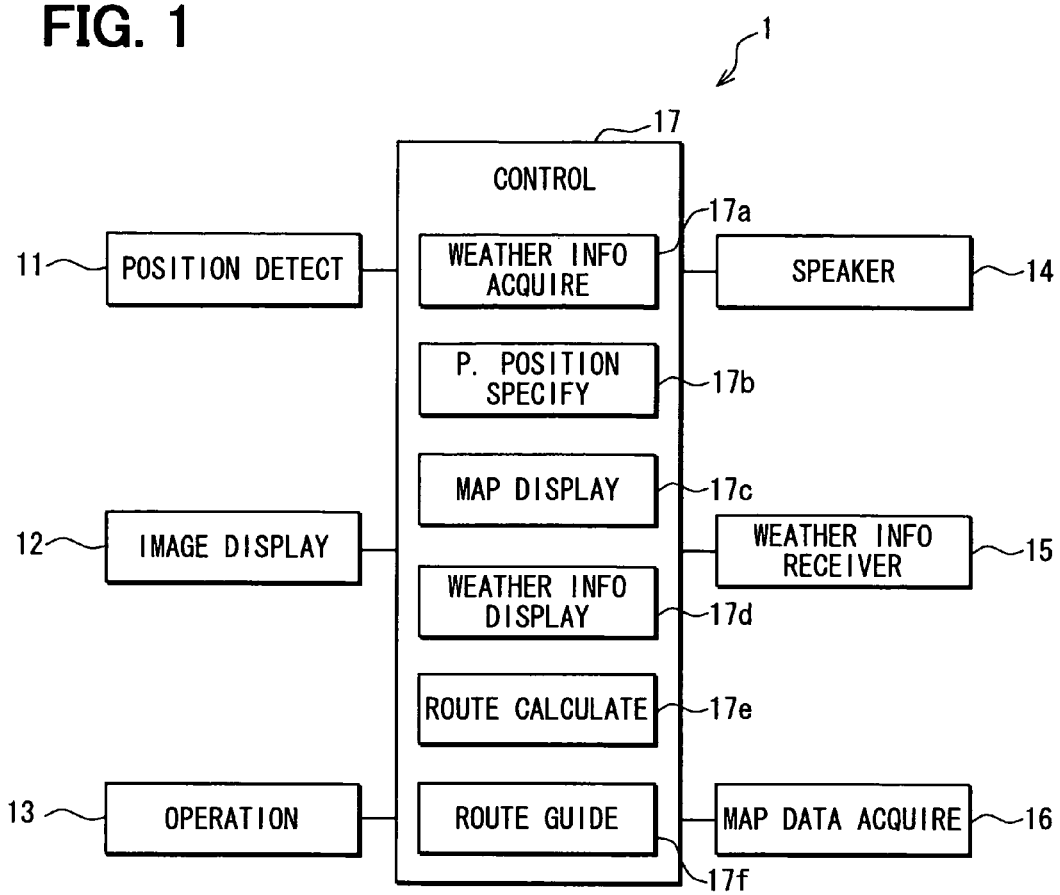
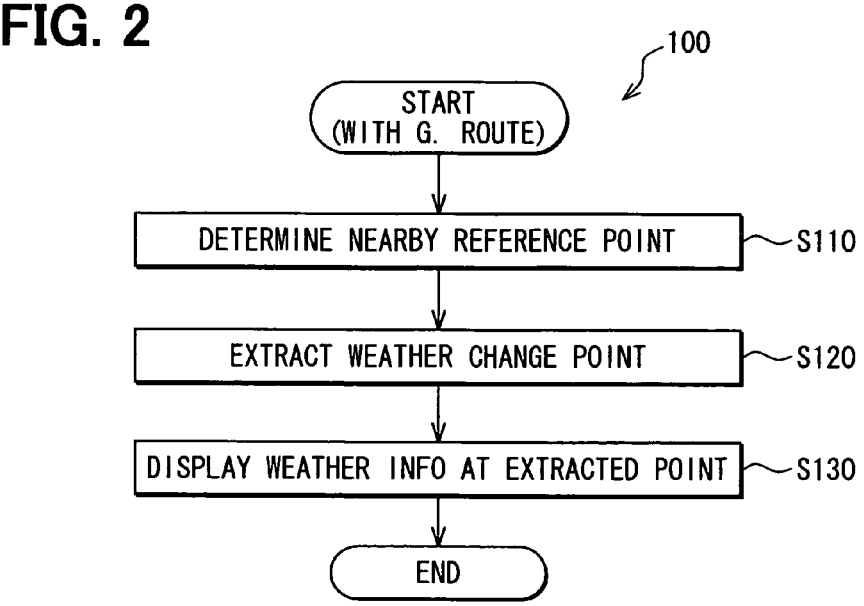

WEATHER INFORMATION NOTIFICATION APPARATUS AND PROGRAM STORAGE MEDIUM

CROSS REFERENCE TO RELATED APPLICATION

This application is based on and incorporates herein by reference Japanese Patent Application No. 2007-281312 filed on Oct. 30, 2007.

FIELD OF THE INVENTION

The present invention relates to a weather information notification apparatus and a program storage medium for the same.

BACKGROUND OF THE INVENTION

Patent Document 1: JP-H11-2539A

Conventionally, there is widely available an apparatus that acquires weather information and notifies users of the acquired weather information. For example, the onboard navigation system disclosed in Patent Document 1 displays maps containing a present position of the subject vehicle and a destination and overlays the maps with weather information relative to locations in the maps.

A user needs to place a remote location such as a destination in a display range of the map so as to be notified of weather information about the remote location using the onboard navigation system according to Patent Document 1. To do this, the user needs to change a display scale of the map or scroll the display range of the map. These operations may be inconvenient.

It may be of little use for the user to be notified of the weather information about the present position because the user can see the weather around himself or herself. The user is most interested in the weather information about a location that is distant from the present position in the direction toward the destination. When notified of such information beforehand, the user can prepare missing utensils such as a tire chain and an umbrella along the way or change the schedule with reference to more detailed weather information. Even when such preparative actions are unnecessary, notifying the weather information can mentally prepare the user for weather changes as the vehicle travels.

SUMMARY OF THE INVENTION

The present invention has been made in consideration of the foregoing. It is therefore a first object of the present invention to provide a technology of displaying weather information relative to a remote location without troubling users while a map containing a present position is displayed.

It is a second object of the present invention to provide a technology of notifying weather information needed for users distinguishably from less useful weather information.

It is a third object of the present invention to provide a technology of notifying weather information capable of indicating a location of weather change as a vehicle travels.

To achieve the first object, as a first example of the present invention, a weather information notification apparatus is provided as follows. The weather information notification apparatus acquires and notifies weather information. The weather information notification apparatus displays in a display device a map containing a present position and notifies a user of the acquired weather information relative to a position outside the display range of the map by displaying the acquired weather information on the map containing the present position.

The weather information notification apparatus can thus display weather information outside the display range of the map while displaying the map containing the present position. The weather information notification apparatus can display weather information relative to remote locations without the need for complicated operations such as changing the map scale or scrolling the map.

The weather information notification apparatus may calculate a scheduled route for the user. The scheduled route to be calculated may be a guidance route or an estimated route. The guidance route is calculated based on direct input of a destination by the user. The estimated route is estimated based on a vehicle travel direction or the like without using direct input of a destination by the user. The scheduled route may correspond to a road or a locus independent of the road such as just a line indicating the direction.

The weather information notification apparatus may extract locations in the zone except the display range of the map along the estimated route. The weather information notification apparatus may notify the user of only the acquired weather information about the extracted locations.

The weather information notification apparatus can notify the weather information needed for the user, that is, the weather information about locations distant from the present position along the estimated route for the user independently of less useful weather information about the present position and the like.

When calculating the estimated route for the user, the weather information notification apparatus may extract a point of changing the weather type of weather information on the estimated route and notifies the user of the weather information relative to the extracted point.

Since the weather information notification apparatus notifies weather information relative to the weather type change point on the scheduled route, the user can easily forecast where the weather changes with the travel for the user.

To achieve the second object, as a second example of the present invention, a weather information notification apparatus is provided as follows. The weather information notification apparatus estimates a scheduled route for a user without accepting direct specification of a destination from the user. The weather information notification apparatus acquires weather information along the estimated scheduled route. The weather information notification apparatus extracts points in a zone except the present position of the user along the scheduled route. The weather information notification apparatus notifies the user of the weather information relative to the extracted point.

Even when the user does not directly specify a destination, the weather information notification apparatus automatically estimates a route intended by the user and notifies the user of the weather information about the zone except the present position along the route. The weather information notification apparatus can notify the weather information needed for the user independently of weather information less useful for the user such as weather information relative to the present position of the user or weather information toward a direction along which the user does not intend to travel. The weather information notification apparatus can perform these operations without requiring the user to directly specify the destination and eliminate the need for specifying a destination.

The weather information notification apparatus may calculate an estimated destination for the user. The weather information notification apparatus defines the end point of the zone as one of the following whichever is farther from the present position: (a) the estimated destination; and (b) a point away from the present position of the user by the reference distance.

The reason is as follows. An estimated destination calculated without direct specification by the user is less likely to be the destination for the user. The weather information notification apparatus notifies weather information up to a point distant from the present position for a predetermined reference distance even when a travel range exceeds the estimated destination. The weather information notification apparatus is effective when the user continues traveling past the estimated destination.

To achieve the third object, as a third example of the present invention, a weather information notification apparatus is provided as follows. The weather information notification apparatus calculates a scheduled route for the user and acquires weather information along the scheduled route. The weather information notification apparatus may extract a point of changing the weather type of weather information on the estimated route and notifies the user of the weather information relative to the extracted point.

Since the weather information notification apparatus notifies weather information relative to the weather change point on the scheduled route, the user can easily forecast where the weather changes with the travel for the user.

The present invention can be embodied as a program storage medium containing instructions readable and executable by a computer, the instructions for causing the computer to achieve the functions included in each of the above weather information notification apparatuses.

Further, the present invention can be embodied as a method for achieving the functions included in each of the above weather information notification apparatuses.

BRIEF DESCRIPTION OF THE DRAWINGS

The above and other objects, features, and advantages of the present invention will become more apparent from the following detailed description made with reference to the accompanying drawings. In the drawings:

FIG. 1 is a configuration diagram showing a vehicular navigation system according to a first embodiment of the present invention;

FIG. 2 is a flow chart of a program performed by a control circuit according to the first embodiment;

DETAILED DESCRIPTION OF THE PREFERRED EMBODIMENTS

First Embodiment

Figure 3:
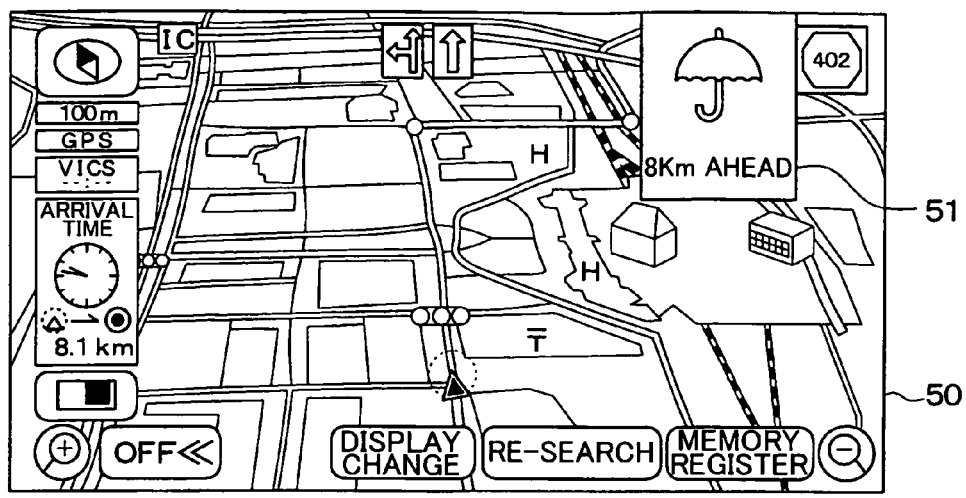
FIG. 3 shows a map and a weather indication overlaid on a map.

A first embodiment of the present invention will be described. FIG. 1 is a block diagram showing a vehicular navigation system 1 according to the embodiment. The vehicular navigation system 1 is equivalent to an example of the weather information notification apparatus. As will be described in detail, the vehicular navigation system 1 according to the embodiment displays weather information relative to a first weather change point in a predetermined zone along a guide route to a specified destination. The weather information is overlaid on a surrounding map that does not contain the change. The predetermined zone ranges from a nearby reference point to the destination. The nearby reference point is settled far from the present position ahead along a guidance route.

As shown in FIG. 1, the vehicular navigation system 1 includes a position detection device 11, an image display device 12, an operation device 13, a speaker 14, a weather information receiver 15, a map data acquisition device 16, and a control circuit 17.

The position detection device 11 includes known sensors such as a geomagnetic sensor, a gyroscope, a vehicle speed sensor, and a GPS receiver. The position detection device 11 outputs, to the control circuit 17, information, which is based on characteristics of the sensors and used for specifying the present position, orientation, and speed of the vehicle.

The image display device 12 displays a video based on a video signal output from the control circuit 17. The video is displayed for the user. The operation device 13 accepts a user operation and outputs a signal corresponding to the accepted operation to the control circuit 17.

The weather information receiver 15 communicates with an origin for transmitting weather information and receives weather information. The weather information receiver 15 outputs the received weather information to the control circuit 17. The origin for transmitting weather information represents a terrestrial station, a satellite radio station, and a server for transmitting weather information via mobile telephone communication.

The map data acquisition device 16 includes nonvolatile storage media such as DVD, CD, and HDD and an apparatus for reading and possibly writing data to the storage media. The storage media store programs executed by the control circuit 17 and map data for route guidance.

The map data contains road data and facility data. The road data contains information relative to links and nodes. The information relative to links includes position information, length information, rank information for classification among expressway, national road, prefectural road, and city road. The information relative to nodes includes position information, type information, and information about connection with links. The facility data contains multiple records for respective facilities. Each record for respective facilities contains data corresponding to information about the name, location, and type of a targeted facility.

The control circuit 17 is equivalent to a computer and represents a microcomputer including a CPU, RAM, ROM, and I/O. The CPU reads a program from the ROM or the map data acquisition device 16 and executes the read program for operations of the vehicular navigation system 1. When executing the program, the CPU reads information from the RAM, the ROM, and the map data acquisition device 16. The CPU writes the information to the RAM and, when possible, the storage media of the map data acquisition device 16. The CPU exchanges signals with the position detection device 11, the image display device 12, the operation device 13, and the speaker 14.

Specifically, the control circuit 17 executes the program to perform a weather information acquisition process 17a, a present position specification process 17b, a map display process 17c, a weather information display process 17d, a guidance route calculation process 17e (also referred to as a scheduled route calculation process), and a route guidance process 17f. In other words, the control circuit 17 includes or functions as a weather information acquisition means or section 17a, a present position specification means or section 17b, a map display means or section 17c, a weather information display means or section 17d, a guidance route calculation means or section 17e (also referred to as a scheduled route calculation means or section 17e), and a route guidance means or section 17f.

The weather information acquisition process 17a acquires weather information through the weather information receiver 15. The weather information to be acquired includes present weather types such as rainy, snowy, fine, cloudy in each geographic zone.

The control circuit 17 may perform the weather information acquisition process 17a to acquire weather information only about a specified range of zone (e.g., 50 kilometers around) including the present position. The control circuit 17 may acquire weather information only about a zone including a point along a guidance route or an estimated route to be described later. The control circuit 17 may perform the weather information acquisition process 17a periodically or as needed, for example, immediately before execution of the weather information display process 17d.

Based on a signal from the position detection device 11, the present position specification process 17b specifies the present position or travel direction of the vehicle using known technologies such as map matching.

The map display process 17c uses map data read from the map data acquisition device 16 to display a map on the image display device 12. The map is displayed in the range of a specified display scale including the present position. The control circuit 17 may vary the display range in accordance with user operations such as enlargement, reduction, and scroll using the operation device 13.

The weather information display process 17d allows the image display device 12 to display part of the weather information acquired by the weather information acquisition process 17a. The weather information is overlaid on a map displayed by the map display process 17c. The weather information display process 17d will be described later in detail.

The guidance route calculation process 17e accepts a destination directly input by the user from the operation device 13 and calculates an optimum guidance route (also referred to as a scheduled route) from the present position to the destination. The direct input signifies input of information capable of uniquely specifying one destination such as input of the name specific to the destination, input of the telephone number of the facility as the destination, selection of one destination from a destination list, or specification of one point as the destination on the map.

The route guidance process 17f overlays the calculated guidance route on a map image for display. The route guidance process 17f allows the speaker 14 to generate an audio guidance signal for indicating a left or right turn as needed when the subject vehicle reaches immediately before a guided intersection.

The weather information display process 17d will be described in detail. The control circuit 17 implements the weather information display process 17d by repeatedly executing the program 100 in FIG. 2 after the guidance route calculation process 17e determines the guidance route. The control circuit 17 parallel executes the map display process 17c and the weather information display process 17d.

At S110 of the program 100, the control circuit 17 determines a nearby reference point. The nearby reference point is located at a first reference distance away from the present position. The first reference distance is measured along the guidance route or straight from the present position. The first reference distance may be fixed or may vary with user setup operations via the operation device 13. The fixed value may be five kilometers, for example.

In contrast, the first reference distance may be equivalent to an actual distance corresponding to one screenful of reduced map normally used for the map display process 17c, that is, a distance between both ends of the screen horizontally or vertically. In such case, the map display process 17c may often leave the nearby reference point out of the present view or display window in the display screen of the image display device 12.

At S120, the control circuit 17 specifies a zone from the nearby reference point to the destination on the guidance route and extracts a nearest weather change point in the specified zone. The nearest weather change point is least distant from the present position along the guidance route.

The weather change point indicates a change of weather type in the weather information. The acquired weather information includes weather type information for each geographic zone. The use of the weather information determines the weather type at each point on the guidance route. The determined weather types change at weather change points along the guidance route.

At S130, the control circuit 17 uses the image display device 12 to display weather information relative to the weather change point extracted at S120. The displayed weather information relative to the weather change point indicates the weather after change at that point. The weather information is overlaid on the map displayed by the map display process 17c.

FIG. 3 shows an example of a display window displayed by the process on the image display device 12. A weather indicator 51 is overlaid on a map 50 around the present position. The weather indicator 51 is equivalent to indications at the weather change point. As seen from the example in FIG. 3, the weather indicator 51 includes indications of the rainy weather and the distance of eight kilometers. The weather is observed after the vehicle passes through the weather change point along the guidance route. The distance is measured from the present position to the weather change point along the guidance route. According to the example, the surrounding map 50 covers a display range of approximate four kilometers square. The surrounding map 50 excludes the weather change point associated with the indications in the weather indicator 51. After S130, one cycle of the program 100 terminates.

When the user specifies the weather indicator 51 using the operation device 13, the control circuit 17 may change the surrounding map 50 to a map containing the weather change point associated with the weather indicator 51. The control circuit 17 may overlay the more detailed weather information on the changed map. The overlaid weather information concerns a range of the changed map. The user can take actions such as changing the travel schedule by referring to the detailed weather information.

By repeatedly executing the program 100, the control circuit 17 extracts changes in the weather (see S120) along the guidance route ahead of the nearby reference point (see S110) varying with the subject vehicle travel and displays the changes (see S130). However, the control circuit 17 does not extract weather change points ahead of the specified destination. The destination does not vary with the vehicle travel without any user operation to change the destination.

As mentioned above, the vehicular navigation system 1 according to the embodiment acquires weather information along the vehicle guidance route. The guidance route is equivalent to an example of a scheduled route for user. The vehicular navigation system 1 extracts points except the present position of the user along the guidance route and notifies the user of weather information relative to the extracted points.

The vehicular navigation system 1 notifies the weather information about the zone except the present position along the guidance route or, more specifically, the zone from the nearby reference point to the destination. It may be of little use for the user to be notified of weather information about the present position because the user can see the weather around himself or herself. The user is most interested in the weather information about a location that is distant from the present position in the direction toward the destination. The vehicular navigation system 1 can notify the weather information needed for the user independently of weather information less useful for the user such as weather information relative to the present position of the user or weather information toward a direction along which the user does not intend to travel.

As shown in FIG. 3, the vehicular navigation system 1 can display not only the map including the present position of the user but also the acquired weather information relative to locations outside the display range of the map.

The vehicular navigation system 1 can display weather information outside the display range of the map while displaying the map containing the present position. The vehicular navigation system 1 can display weather information relative to remote locations without the need for complicated operations such as changing the map scale or scrolling the map.

The vehicular navigation system 1 extracts locations in the zone along the guidance route except the present display range on the map in the image display device 12. The vehicular navigation system 1 notifies the user of only the acquired weather information about the extracted locations.

The vehicular navigation system 1 excludes the weather information around the present position from the display targets. The vehicular navigation system 1 can notify the weather information needed for the user, that is, the weather information about locations distant from the present position independently of less useful weather information about the present position and the like.

The vehicular navigation system 1 assigns the settled destination to the end point of the zone targeted for extraction of weather change points. Since weather information about remote locations less possible to travel is excluded from display targets, it is possible to decrease the possibility of burying the useful weather information in unnecessary weather information.

The vehicular navigation system 1 extracts a weather change point that changes the weather type of weather information along the guidance route. The vehicular navigation system 1 notifies the user of the weather information changed at the extracted weather change point. The user is notified of the weather information changed at the weather change point along the guidance route. The user can easily forecast where the weather changes with the travel for the user.

A weather change is extracted at the first weather change point from the nearby reference point along the guidance route. The most important weather information for the user is a change in the weather in the course of the travel. It is possible to provide the weather information most needed for the user by notifying the weather change at the first weather change point.

Second Embodiment

Figure 4:
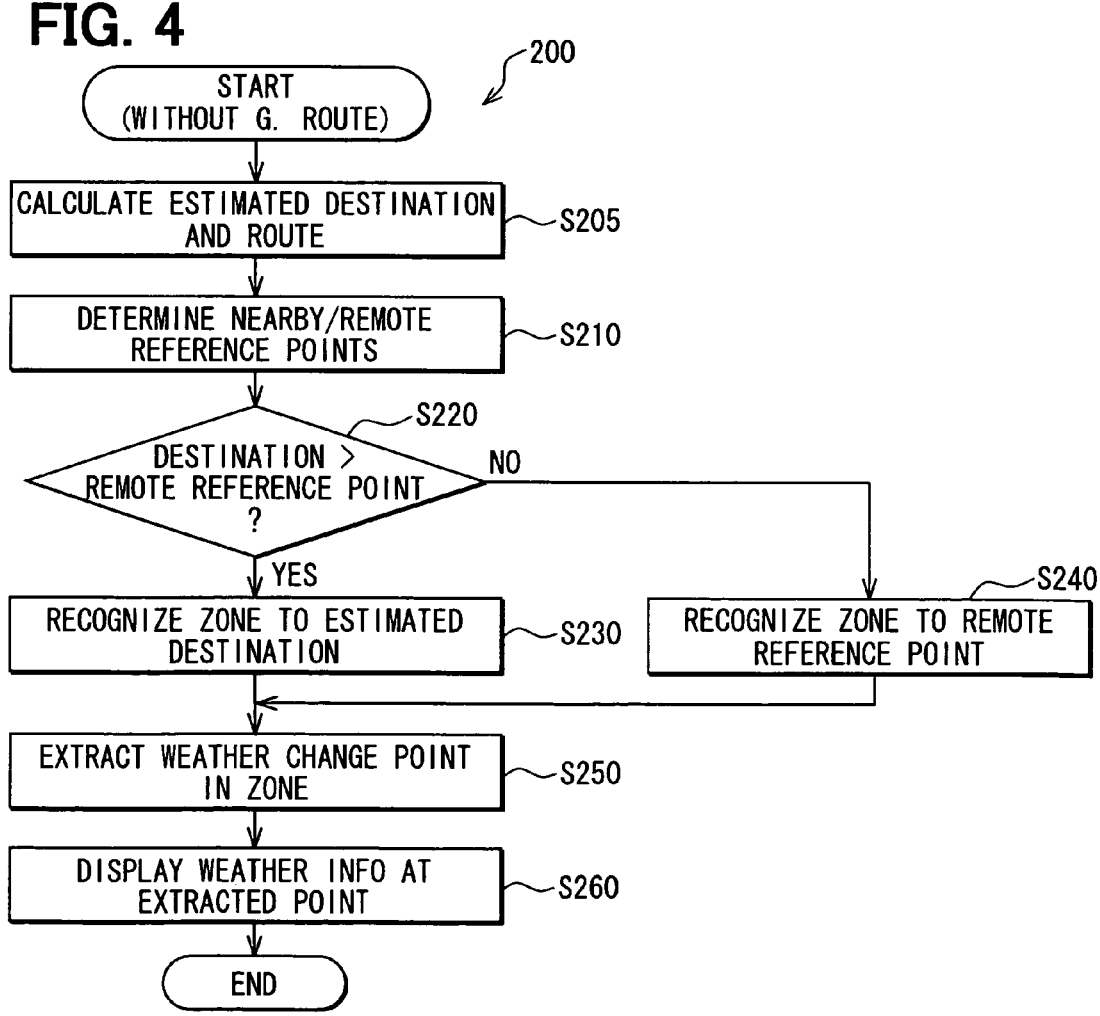
FIG. 4 is a flow chart of a program performed by a control circuit according to a second embodiment of the present invention.

A second embodiment of the present invention will be described. The second embodiment differs from the first embodiment in that the control circuit 17 allows the map display process 17*c* to perform a program 200 as shown in FIG. 4 in addition to the program 100.

The control circuit 17 repeatedly executes the program 200 when the subject vehicle runs and the user does not directly specify the destination. No guidance route is determined while the program 200 is executing. Like execution of the program 100, the control circuit 17 executes the map display process 17*c* concurrently with the program 200.

The control circuit 17 executes the program 200 as follows. At S205, the control circuit 17 calculates an estimated destination and an estimated route. The estimated destination is a point the user assumes to be the destination of the travel by the subject vehicle. The estimated route is a road assumed to be traveled by the subject vehicle to reach the estimated destination. The control circuit 17 specifies the estimated destination and the estimated route without accepting direct input of the destination by the user.

Specifically, the control circuit 17 assumes the estimated route to be formed along a road the subject vehicle is traveling in the traveling direction. The control circuit 17 assumes the estimated destination to be located at an estimated mileage along the estimated route from the location of starting driving the subject vehicle or, more specifically, the point of most recently switching on the ignition of the vehicle.

The estimated mileage may be found by multiplying an average operation time of the vehicular navigation system 1 and an average travel speed of the subject vehicle together. The average operation time signifies an average period in which a main power supply of the vehicular navigation system 1 is continuously turned on.

The average operation time may be fixed to two hours, for example. The user may use the operation device 13 to set the average operation time. It may be preferable to use the map data acquisition device 16 or other writable storage media to record the operation time of the vehicular navigation system 1 for past travels of the subject vehicle and calculate the average operation time based on the recorded operation time.

The average travel speed may be fixed to 30 kilometers per hour, for example. The user may use the operation device 13 to set the average travel speed. It may be preferable to use the map data acquisition device 16 or other writable storage media to record transition of running speeds of the subject vehicle for past travels thereof and calculate the average travel speed based on the recorded speeds.

The estimated mileage itself may be fixed. The user may use the operation device 13 to set the estimated mileage. It may be preferable to use the map data acquisition device 16 or other writable storage media to record transition of total mileage in the past travels of the subject vehicle to find the estimated mileage by averaging the recorded mileage. Each travel of the subject vehicle is defined as a period between switching on and off the ignition.

The average operation time, the average speed, or the estimated mileage may be determined based on records of past travels. It may be preferable to record the day of the week when the record is made for each travel. It may be preferable to calculate an average of the records only on the same day of the week as the present one.

The record may contain a distinction between weekday and holiday for the recording. An average value may be calculated only for a holiday or a week day that is equivalent to the present day.

The control circuit 17 may specify vehicle speeds corresponding to rank information about links in map data. For example, an expressway corresponds to 80 kilometers per hour. A national road corresponds to 40 kilometers per hour. A prefectural road or a city road corresponds to 30 kilometers per hour. In this case, the control circuit 17 may sequentially follow links from the start point along an estimated route, divide a distance of the link by a vehicle speed corresponding to each information about the link, and accumulate division results for the links. When the accumulation result reaches the average operation time for a link, the control circuit 17 may assume the end of the link to be the estimated destination.

The control circuit 17 may determine the estimated route and the estimated destination based on the history of past travels using various behavior metrics techniques.

At S210, the control circuit 17 calculates the nearby reference point and the remote reference point. To calculate the nearby reference point, the control circuit 17 uses the method of specifying the nearby reference point according to the first embodiment. In this case, the guidance route is replaced by the estimated route.

A remote reference point is located at a second reference distance away from the present position. The second reference distance is measured along the estimated route or straight from the present position. The second reference distance may be fixed or may vary with user operations via the operation device 13. The second reference distance is larger than the first reference distance used to specify the nearby reference point.

The fixed second reference distance may be fifty kilometers, for example. The second reference distance may be equivalent to double an actual distance corresponding to one screenful of reduced map normally used for the map display process 17c, that is, a distance between both ends of the screen horizontally or vertically. In the latter case, the map display process 17c may often leave the remote reference point out of the present view or display window in the display screen of the image display device 12.

Figure 5:
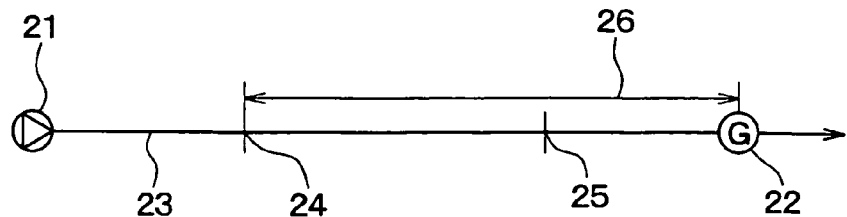
FIG. 5 is a schematic diagram showing relation between an estimated destination, a remote reference point, and a target zone.
Figure 6:
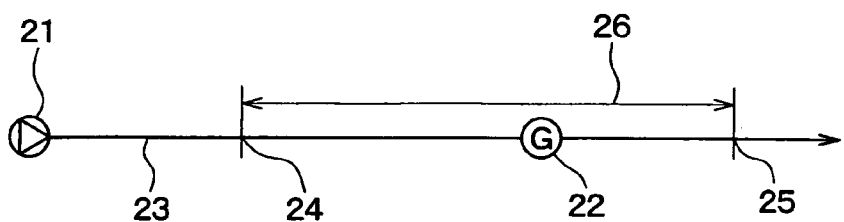
FIG. 6 is another schematic diagram showing relation between an estimated destination, a remote reference point, and a target zone.

At S220, the control circuit 17 determines whether or not the destination is farther from the present position than the remote reference point on the estimated route. FIGS. 5 and 6 show relation between the nearby reference point 24 and remote reference point 25 from the present position 21 to the estimated destination 22 on the estimated route 23.

FIG. 5 shows that the destination is farther than the remote reference point. In this case, at S230, the control circuit 17 recognizes a zone 26 from the nearby reference point to the destination along the estimated route and assumes the zone 26 to be an extracted target zone. FIG. 6 shows that the remote reference point is farther than the destination. At S240, the control circuit 17 recognizes the zone 26 from nearby reference point to the remote reference point and assumes the zone 26 to be the extracted target zone.

The estimated destination 22 is settled with reference to the start point of the estimated route 23. The remote reference point 25 is settled with reference to the present position 21. Even though the estimated destination 22 is farther than the remote reference point 25 at first, the remote reference point 25 may become farther than the estimated destination 22 with the travel of the subject vehicle.

At S250, the control circuit 17 extracts the nearest weather change point in the target zone 26 in the same method as the first embodiment. At S260, the control circuit 17 uses the image display device 12 to display weather information relative to the weather change point extracted at S250. The displayed weather information relative to the weather change point indicates the weather after change at that point. The weather information is overlaid on the map displayed by the map display process 17c.

By repeatedly executing the program 200, the control circuit 17 extracts changes in the weather (see S250) along the estimated route 23 ahead of the nearby reference point 24 (see S210) varying with the subject vehicle travel and displays the changes (see S260). However, the control circuit 17 does not extract weather change points ahead of the end point of the extracted target zone 26.

As mentioned above, the vehicular navigation system 1 according to the embodiment generates an estimated route for the vehicle without requiring the user to directly specify a destination. The estimated route is equivalent to an example of the scheduled route for user. The vehicular navigation system 1 acquires weather information along the estimated route, extracts points in the target zone 26 except the present position of the user on the estimated route, and notifies the user of the weather information relative to the extracted points. Herein, "except the present position" signifies, for example, "except a zone from the current position 21 to the nearby reference point 24."

Even when the user does not directly specify a destination, the vehicular navigation system 1 automatically estimates a route intended by the user and notifies the user of the weather information about the zone except the present position along the route. The vehicular navigation system 1 can notify the weather information needed for the user independently of weather information less useful for the user such as weather information relative to the present position of the user or weather information toward a direction along which the user does not intend to travel. The vehicular navigation system 1 can perform these operations without requiring the user to directly specify the destination and eliminate the need for specifying a destination.

The vehicular navigation system 1 calculates not only the estimated destination for the user but also the scheduled route as a route to the estimated destination. The vehicular navigation system 1 defines the end point of the extracted target zone 26 as one of the following whichever is farther from the present position 21: (a) the estimated destination 22; and (b) the remote reference point 25 away from the present position 21 for the user by the second reference distance.

The reason is as follows. An estimated destination calculated without direct specification by the user is less likely to be the destination for the user. The vehicular navigation system 1 notifies weather information up to the remote reference point even when a travel range exceeds the estimated destination. The vehicular navigation system 1 is effective when the subject vehicle continues traveling past the estimated destination.

The vehicular navigation system 1 displays the map containing the present position of the user. Further, the vehicular navigation system 1 often displays weather information relative to locations outside the display range of the map. The vehicular navigation system 1 can display weather information outside the display range of the map while displaying the map containing the present position. The vehicular navigation system 1 can display weather information relative to remote locations without the need for complicated operations such as changing the map scale or scrolling the map.

The vehicular navigation system 1 can extract locations in the zone except the display range of the map along the estimated route. The vehicular navigation system 1 can notify the user of only the acquired weather information about the extracted locations.

The vehicular navigation system 1 can notify the weather information needed for the user, that is, the weather information about locations distant from the present position along the estimated route for the user independently of less useful weather information about the present position and the like.

When calculating the estimated route for the user, the vehicular navigation system 1 extracts a point of changing the weather type of weather information on the estimated route and notifies the user of the weather information relative to the extracted point.

Since the vehicular navigation system 1 notifies weather information relative to the weather change point on the estimated route, the user can easily forecast where the weather changes with the travel for the user.

Third Embodiment

Figure 7:
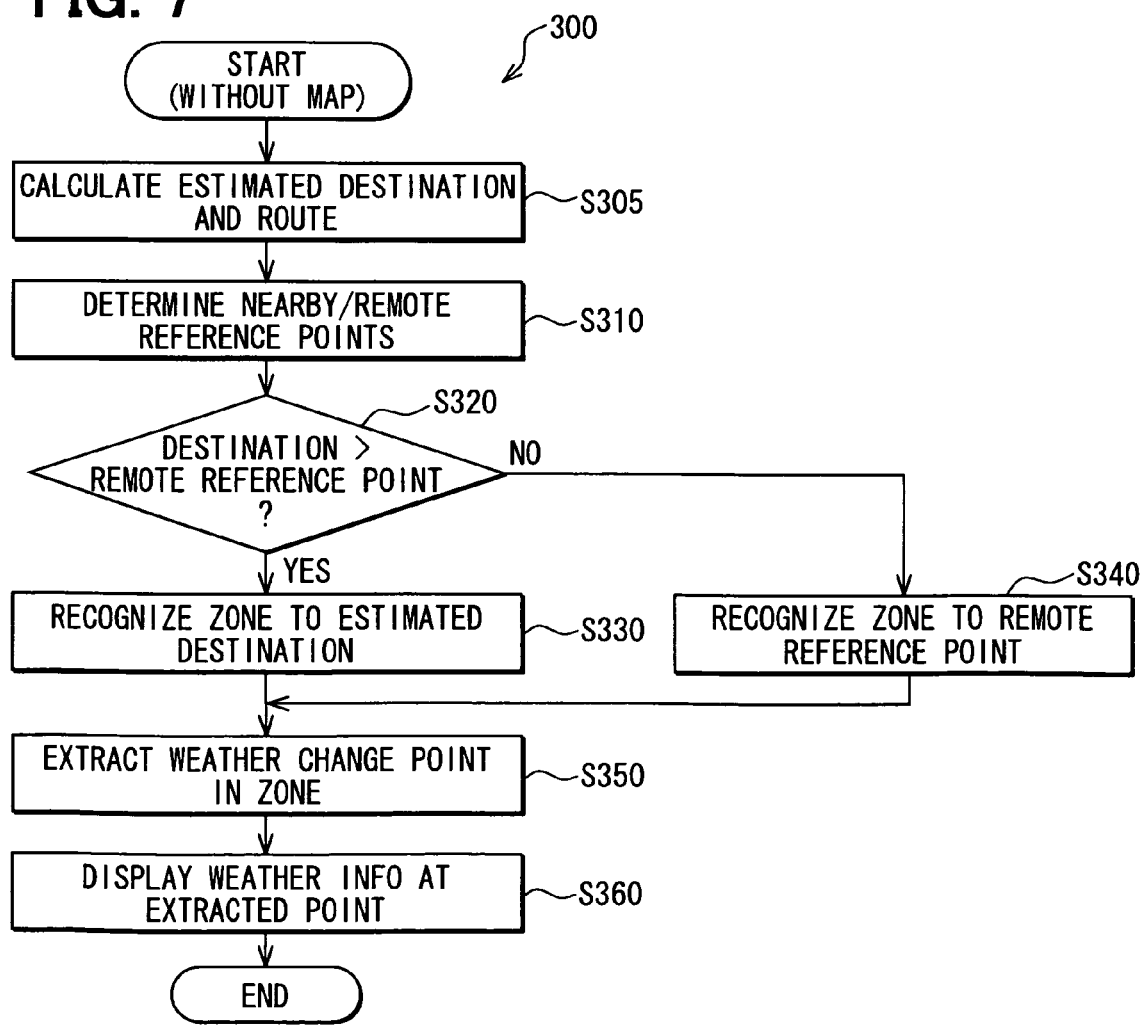
FIG. 7 is a flow chart of a program performed by a control circuit according to a third embodiment of the present invention.

A third embodiment of the present invention will be described. An onboard weather information notification apparatus according to the embodiment is equivalent to an example of the weather information notification apparatus. The onboard weather information notification apparatus is configured equally to the vehicular navigation system 1 according to the second embodiment except that the map data acquisition device 16 is not provided. With respect to operations, the onboard weather information notification apparatus according to the embodiment differs from the vehicular navigation system 1 according to the second embodiment as follows. The control circuit 17 according to the embodiment performs none of the map display process 17c, the guidance route calculation process 17e, and the route guidance process 17f. The control circuit 17 allows the weather information display process 17d to perform a program 300 in FIG. 7 instead of the programs 100 and 200.

The onboard weather information notification apparatus according to the embodiment has no map data and is therefore incapable of acquiring information about road structures in an area where the subject vehicle travels. The onboard weather information notification apparatus cannot display a map or calculate a route along a road. Accordingly, the weather information display process 17d allows the image display device 12 to display weather information without being overlaid on the map.

The following describes operations of the control circuit 17 that executes the program 300. The control circuit 17 repeatedly executes the program 300 after the subject vehicle starts running.

At S305, the control circuit 17 determines the estimated destination and the estimated route. To do this, the control circuit 17 uses the present position and the travel direction of the subject vehicle determined by the present position specification process 17b. Specifically, the estimated route is defined as a line extending from the present position in the travel direction. The estimated destination is defined as a position as far as the estimated mileage away from the position of the subject vehicle to start the travel along the estimated route. The control circuit 17 specifies the estimated mileage using the same method as the second embodiment. Since the onboard weather information notification apparatus according to the embodiment uses no map data, the control circuit 17 cannot use the method of using the rank information about links in the map data.

The process at S310, S320, S330, S340, and S350 are equal to that at S210, S220, S230, S240, and S250 of the program 200 according to the second embodiment.

At S360 following S350, the control circuit 17 uses the image display device 12 to display the weather information relative to the weather change point extracted at S260. Similarly to the second embodiment, the displayed weather information relative to the weather change point indicates the weather after it is changed at the weather change point.

Figure 8:
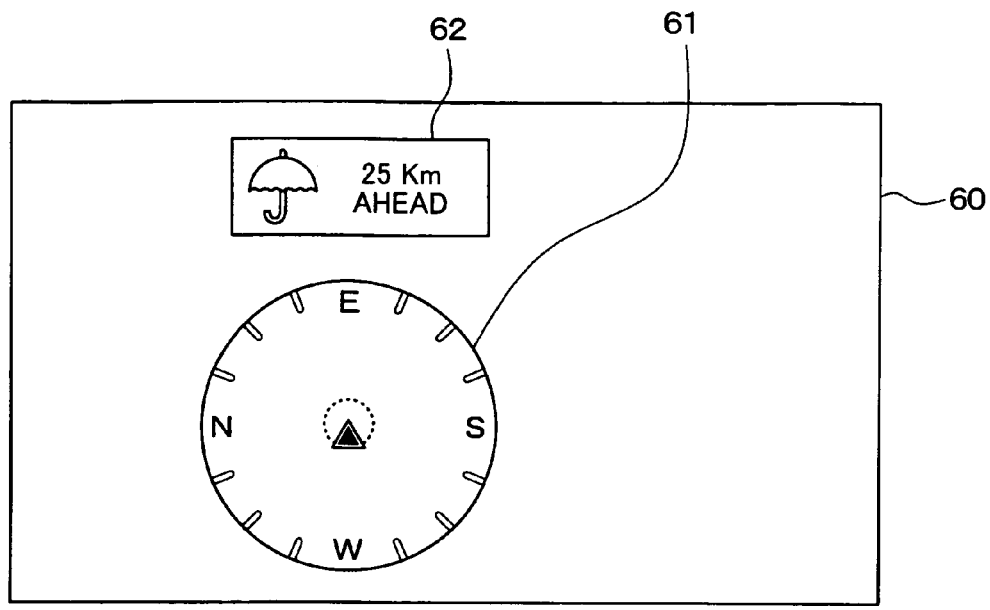
FIG. 8 shows a weather indication window.

Unlike the second embodiment, however, the weather information is not overlaid on the map displayed by the map display process 17c. As shown in FIG. 8, for example, the image display device 12 displays weather information using a direction indicator 61 and a weather indicator 62 in a weather indication screen 60. The direction indicator 61 indicates the travel direction of the vehicle. The weather indicator 62 indicates a distance from the present position to the nearest weather change point in the extracted target zone and the weather after it is changed at the weather change point.

By repeatedly executing the program 300, the control circuit 17 extracts changes in the weather (see S350) along the estimated route ahead of the nearby reference point (see S310) varying with the subject vehicle travel and displays the changes (see S360). However, the control circuit 17 does not extract weather change points ahead of the end point of the extracted target zone 26.

As mentioned above, the onboard weather information notification apparatus according to the embodiment generates an estimated route for the vehicle without requiring the user to directly specify a destination. The estimated route is equivalent to an example of the scheduled route for user. The weather information notification apparatus acquires weather information along the estimated route, extracts points except the present position of the user on the estimated route, and notifies the user of the weather information relative to the extracted points.

Even when the user does not directly specify a destination, the weather information notification apparatus automatically estimates a route intended by the user and notifies the user of the weather information only about the zone except the present position along the route. The weather information notification apparatus can notify the weather information needed for the user independently of weather information less useful for the user such as weather information relative to the present position of the user or weather information toward a direction along which the user does not intend to travel. The weather information notification apparatus can perform these operations without requiring the user to directly specify the destination and eliminate the need for specifying a destination.

The weather information notification apparatus calculates the estimated destination for the user. The weather information notification apparatus defines the end point of the extracted target zone as one of the following whichever is farther from the present position: (a) the estimated destination; and (b) the remote reference point away from the present position of the user by the second reference distance.

The reason is as follows. An estimated destination calculated without direct specification by the user is less likely to be the destination for the user. The weather information notification apparatus notifies weather information up to the remote reference point even when a travel range exceeds the estimated destination. The weather information notification apparatus is effective when the subject vehicle continues traveling past the estimated destination.

The onboard weather information notification apparatus extracts a point of changing the weather type of weather information on the estimated route and notifies the user of the weather information relative to the extracted point. Since the onboard weather information notification apparatus notifies weather information relative to the weather change point on the estimated route, the user can easily forecast where the weather changes with the travel for the user.

Using the position and the travel direction of the subject vehicle, the onboard weather information notification apparatus can specify the estimated route and the estimated destination without using map data.

In the above embodiments, the control circuit 17 executes the programs 100, 200, 300. Herein, the control circuit 17 functions as an extraction means or section for individually extracting the various kinds of points at S120, S250, and S350, and functions as a notification means or section for notifying a user of the various kinds of information at S130, S260, S360.

Other Embodiments

While there have been described specific preferred embodiments of the present invention, it is to be distinctly understood that the present invention is not limited thereto but may include various modes capable of embodying functions of items specific to the invention.

In the first to third embodiments, for example, the control circuit 17 may extract not only the nearest weather change point but also all weather change points in the specified zone and display the extracted weather change points on the image display device 12.

The weather information acquired by the control circuit 17 using the weather information acquisition process 17a may include a future weather type corresponding to each geographic zone based on the weather forecast for the geographic zone. In this case, the weather information notification apparatus needs to determine whether or not a predetermined point is a weather change point. To do this, the weather information notification apparatus may use a weather type after a lapse of time required to move to that point from the present position. In this case, the weather information relative to the weather change point to be notified to the user may use a weather type after a lapse of time required to move to that weather change point from the present position. The time required for moving can be found by a process that divides a distance to the target point by an average vehicle speed, for example.

The first through third embodiments use a fixed value or a user-defined value for the first reference distance for specifying a nearby reference point and the second reference distance for specifying a remote reference point.

In addition to the method, a near-place arrival time, an average travel speed, and a distant-place arrival time may be used as fixed values. The near-place arrival time may be defined as 10 or 20 minutes, for example. The average travel speed may be defined as 30 kilometers per hour, for example. The distant-place arrival time may be defined as one or two hours, for example. The first reference distance may be defined as a result of multiplying the near-place arrival time by the average travel speed. The second reference distance may be defined as a result of multiplying the distant-place arrival time by the average travel speed. In this case, the distant-place arrival time is assumed to be longer than the near-place arrival time. The near-place arrival time and the distant-place arrival time may not be fixed but may be specified by a user using the operation device 13.

The control circuit 17 may calculate the first and second reference distances based on the scale of the presently displayed map and the present position. For example, the first reference distance may be found by multiplying a distance from the present position to a point not displayed on the map and coefficient a together. The second reference distance may be double the first reference distance.

The "distance from the present position to a point not displayed on the map" may be defined as follows. For example, let us suppose that the present position is centered at the displayed map whose side is x kilometers. The distance from the present position to a point not displayed on the map may be half x.

Let us suppose that the vehicle travels along the guidance route or the estimated route from the present position. The length of the route traveled up to the end of the presently displayed map may be defined as the distance from the present position to a point not displayed on the map. When the coefficient a is greater than 1, the extracted target zone is always positioned outside the display range of the map.

The control circuit 17 executes the programs to provide the functions according to the above-mentioned embodiments. The functions may be implemented on such hardware including the equivalent functions as FPGA capable of programming the circuitry.

The navigation system according to the embodiments is mounted on vehicles, but may be also mounted on ship and aircraft or may be portable. For example, a mobile telephone having navigation functions is also equivalent to the navigation system according to the invention.

Each or any combination of processes, steps, or means explained in the above can be achieved as a software portion or section (e.g., subroutine) and/or a hardware portion or section (e.g., circuit or integrated circuit), including or not including a function of a related device; furthermore, the hardware portion or section can be constructed inside of a microcomputer.

Furthermore, the software portion or section or any combinations of multiple software portions or sections can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A weather information notification apparatus comprising:
   a weather information acquisition section configured to acquire weather information;
   a notification section configured to display (i) a map containing a present position of a user and (ii) weather information relative to a position outside a display range of the map, among the acquired weather information;
   a scheduled route calculation section configured to calculate a scheduled route for a user; and
   an extraction section configured to extract a point in a zone except a display range of the map along the scheduled route, wherein:
   the scheduled route calculation section calculates an estimated destination for the user;
   the extraction section defines an end point of the zone as one of the following, whichever is furthest from the present position: (i) the estimated destination and (ii) a point by a predetermined reference distance away from the present position; and
   the notification section notifies the user of weather information relative to the point extracted by the extraction section.

2. The weather information notification apparatus according to claim 1, wherein:
   the extraction section extracts, as the point in the zone, a change point of a weather type in the weather information along the scheduled route; and
   the notification section notifies the user of weather information relative to the change point extracted by the extraction section.

3. The weather information notification apparatus according to claim 1, wherein:

the scheduled route calculation section estimates a scheduled route for a user without accepting direct specification of a destination from the user; and the weather information acquisition section acquires weather information along the scheduled route.

4. A weather information notification apparatus comprising:

a scheduled route calculation section configured to estimate a scheduled route for a user without accepting direct specification of a destination from the user;

a weather information acquisition section configured to acquire weather information along the scheduled route;

an extraction section configured to extract a point in a zone along the scheduled route, the zone excluding a present position of the user; and a notification section configured to notify the user of, among the acquired weather information, weather information relative to the point in the zone extracted by the extraction section, wherein the scheduled route calculation section calculates an estimated destination for the user; and the extraction section defines an end point of the zone as one of the following, whichever is furthest from the present position: (i) the estimated destination and (ii) a point by a predetermined reference distance away from the present position.

5. The weather information notification apparatus according to claim 4, wherein the extraction section extracts, as the point in the zone, a change point of a weather type in the weather information along the scheduled route; and the notification section notifies the user of weather information relative to the change point extracted by the extraction section, among the acquired weather information.

6. A non-transitory program storage medium containing instructions readable and executable by a computer, the instructions for causing the computer to function as:

a weather information acquisition section configured to acquire weather information;

a notification section configured to display (i) a map containing a present position of a user and (ii) weather information relative to a position outside a display range of the map, among the acquired weather information;

a scheduled route calculation section configured to calculate a scheduled route for the user; and an extraction section configured to extract a point in a zone except a display range of the map along the scheduled route, wherein:

the scheduled route calculation section calculates an estimated destination for the user;

the extraction section defines an end point of the zone as one of the following, whichever is furthest from the present position: (i) the estimated destination and (ii) a point by a predetermined reference distance away from the present position; and the notification section notifies the user of weather information relative to the point extracted by the extraction section.

7. A non-transitory program storage medium containing instructions readable and executable by a computer, the instructions for causing the computer to function as:

a scheduled route calculation section configured to estimate a scheduled route for a user without accepting direct specification of a destination from the user;

a weather information acquisition section configured to acquire weather information along the scheduled route;

an extraction section configured to extract a point in a zone along the scheduled route, the zone excluding a present position of the user; and a notification section configured to notify the user of, among the acquired weather information, weather information relative to the point in the zone extracted by the extraction section, wherein the scheduled route calculation section calculates an estimated destination for the user; and the extraction section defines an end point of the zone as one of the following, whichever is furthest from the present position: (i) the estimated destination and (ii) a point by a predetermined reference distance away from the present position.

8. A method for notifying a user of weather information, the method comprising:

acquiring weather information;

displaying a map containing a present position of the user;

notifying the user of weather information relative to a position outside a display range of the map, among the acquired weather information by displaying the weather information relative to the position on the map;

estimating a scheduled destination and a scheduled route for the user; and extracting a point in a zone except a display range of the map along the scheduled route, wherein:

in the notifying, the user is notified of weather information relative to the point extracted in the extracting; and in the extracting, an end point of the zone is defined as one of the following, whichever is furthest from the present position: (i) the estimated destination and (ii) a point by a predetermined reference distance away from the present position.

9. A non-transitory computer readable storage medium comprising instructions for execution by a computer, the instructions including the method according to claim 8, which is computer-implemented.

10. A method for notifying a user of weather information, the method comprising:

estimating estimate a scheduled route for the user without accepting direct specification of a destination from the user;

acquiring weather information along the scheduled route;

extracting a point in a zone along the scheduled route, the zone excluding a present position of the user; and notifying the user of, among the acquired weather information, weather information relative to the point in the extracted zone, wherein:

in the estimating, an estimated destination for the user is calculated; and in the extracting, an end point of the zone is defined as one of the following, whichever is furthest from the present position: (i) the estimated destination and (ii) a point by a predetermined reference distance away from the present position.

11. A non-transitory computer readable storage medium comprising instructions for execution by a computer, the instructions including the method according to claim 10, which is computer-implemented.

* * * * *